Feb. 26, 1952      G. N. CADE      2,587,107
PROCESS FOR PRODUCING CARBON BLACK
Filed Dec. 5, 1949
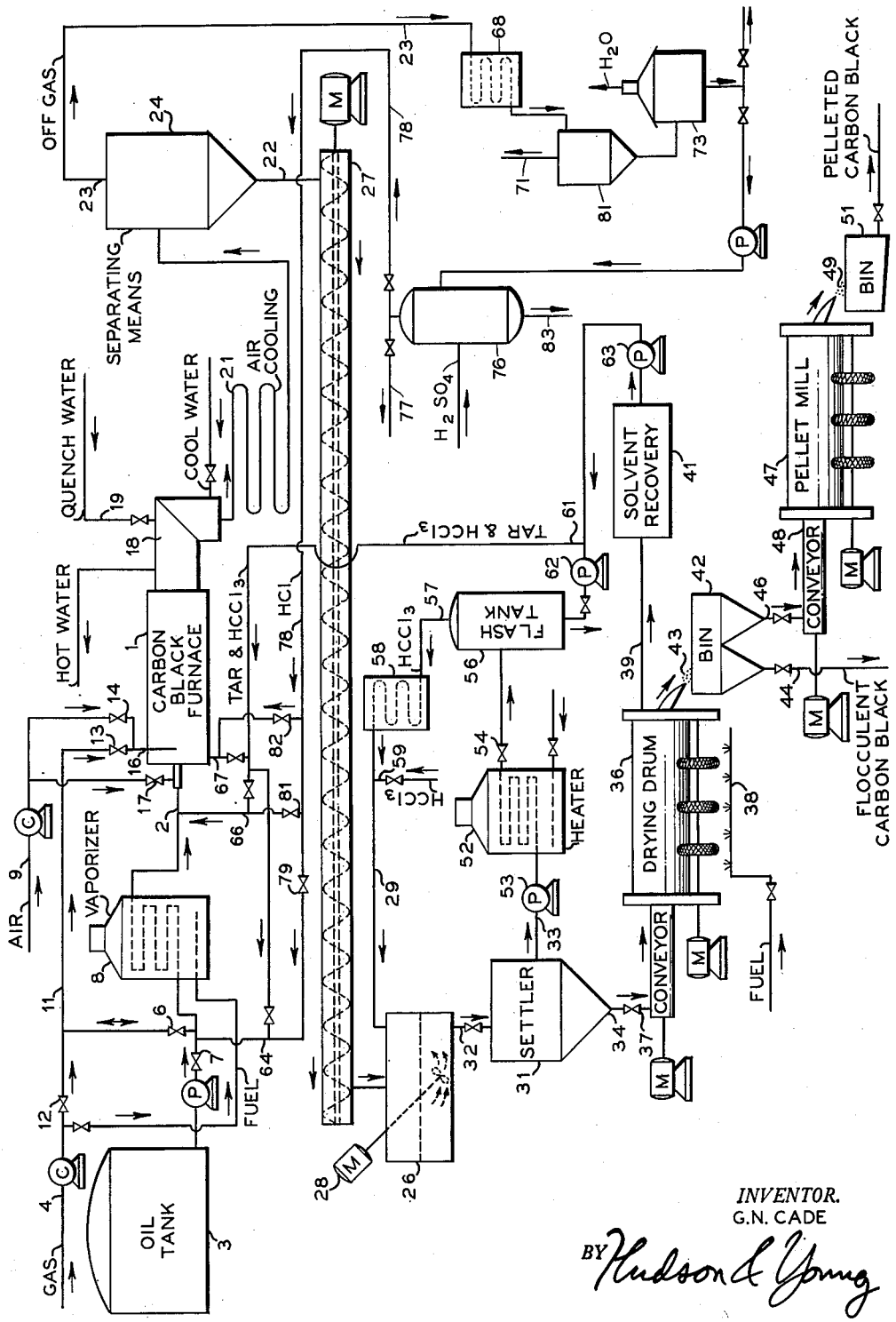
INVENTOR.
G.N. CADE
BY Hudson & Young
ATTORNEYS Patented Feb. 26, 1952

2,587,107

UNITED STATES PATENT OFFICE 2,587,107

PROCESS FOR PRODUCING CARBON BLACK

George N. Cade, Bartlesville, Okla., assignor to Phillips Petroleum Company, a corporation of Delaware Application December 5, 1949, Serial No. 131,129

15 Claims. (Cl. 23—209.4)

This invention relates to the production of carbon black. In one specific aspect it relates to the production of carbon black in a furnace by pyrochemical action in which properties of the carbon black are improved by the presence of chlorinated hydrocarbons in the hydrocarbons being reacted to form the carbon black. In another specific aspect it relates to the production of larger amounts of carbon black than could normally be produced in such a furnace, but said carbon black containing tar which must be removed, and then utilizing said tar as removed by a chlorinated hydrocarbon along with a tar contaminated portion of said solvent in the reaction zone of said furnace to improve the quality of said carbon black. In another specific aspect hydrogen chloride is produced as a by-product.

While the present process is applicable to any type of carbon black furnace with valuable results, it is particularly adapted to operate with carbon black furnaces having a circumferentially and/or helically moving blanket of air, air and fuel, flame, and/or hot combustion gases such as disclosed in the patent to Ayers Re. 22,886 June 3, 1947, Krejci Patents 2,375,795; 2,375,796; 2,375,797 and 2,375,798 all of May 15, 1945 and all such similar carbon black furnace processes.

It has been found that in the making of carbon black in carbon black furnace processes that the total yield of carbon black, and the yield per unit of reactant hydrocarbon, may be increased when the rate of feed of said hydrocarbon is increased relative to the amount of free-oxygen-containing gas, such as air, supplied to the furnace, but that the carbon black so produced is commercially unacceptable to the rubber compounding industry and other carbon black consuming industries because of the high tar content. At the same time some carbon blacks so produced have a low scorch time, that is, they tend to produce effects resembling premature vulcanization in rubber compounds in a relatively short compounding time, which short scorch time appears to be correlated with the high pH of such carbon black.

The present invention improves the qualities of such carbon black by removing the tar with a chlorinated solvent, and by passing a portion of said solvent to the reaction zone of the carbon black furnace. The carbon black is formed in the presence of hydrogen chloride, which further improves the qualities of the carbon black, especially by increasing the scorch time and lowering the pH, while at the same time hydrogen chloride is formed as a valuable by-product.

One object of the invention is to produce increased quantities of commercially acceptable carbon black per furnace hour and/or per unit of hydrocarbon feed.

Another object is to produce carbon black having improved qualities such as increased scorch time and/or lowered pH.

Another object is to produce hydrogen chloride as a by-product.

Numerous other objects and advantages will be apparent to those skilled in the art upon reading the accompanying specification, claims and drawings.

In the drawings

The sole figure in the drawings is a schematic diagram with the parts shown by conventional symbols of a carbon black producing plant embodying the present invention.

A carbon black furnace 1 is provided which preferably is constructed and operated as set forth in the patents mentioned above, but which may be any carbon black furnace in which hydrocarbons are converted to carbon black by pyrochemical action and which furnace is adapted to produce increased quantities of tar containing carbon black by increasing the hydrocarbon feed relative to the feed of free-oxygen containing gas, such as air.

Furnace 1 is provided with a reactant hydrocarbon feed 2 which is passed axially through the furnace and this hydrocarbon feed may be either oil from tank 3 or gas from line 4 or both, valves 6 and 7 being opened or closed to vary the composition of feed 2, and feed 2 may be vaporized and/or preheated in vaporizer 8. At the same time free-oxygen containing gas, such as air 9, either with or without fuel in the form of gas 4 and/or oil 3 coming through line 11 depending upon the position of valves 6 and 12, is blended by means of valves 13 and 14 and is injected tangentially into furnace 1 through pipe 16. A portion of the hydrocarbon 2 and/or the fuel 11 is burned in the free-oxygen containing gas 9 in furnace 1 to heat the remaining portion of the hydrocarbon 2 to such an extent that pyrochemical action converts a portion thereof to carbon black, and it is the intention in the present invention to so regulate the feeds to furnace 1 that a carbon black containing substantial quantities of tar is produced. If desired, some of air 9 may be admitted through valve 17 into a small annular space surrounding feed pipe 2 in order to reduce or obviate the formation of carbon black or tar on the end of feed pipe 2 during long continued operation of furnace 1. As all these features of furnace operation are fully disclosed in patents mentioned above they are only mentioned briefly in this specification.

The tar content of the carbon black is determined by mixing 2 grams of black with 50 cc. of chloroform, boiling the mixture, filtering out the carbon black, and determining the percentage of light transmittance of the filtrate as compared with the transmittance of a blank sample of chloroform. The comparison is preferably conducted with a photoelectric colorimeter. A carbon black containing tar which should be removed before it is commercially acceptable will have a filtrate which transmits less than 85% of the light transmitted by the blank sample of chloroform. As this is all ordinary laboratory procedure nothing mentioned in this paragraph is shown in the drawings.

It is customary to cool the resulting carbon black containing gases from furnace 1 below the ignition or further reaction temperatures by any suitable means such as water jacket 18, water quench 19 and/or indirect heat exchange with the air at 21. It is then customary to separate the carbon black 22 from the off gas 23 by means of any suitable means, such as separating means 24. Means 24 may be electrical precipitators, cyclone separators, and/or bags or filters (not shown) or any combination of the same found suitable by the prior art.

In the present invention the carbon black 22 contains tar and is transferred to a liquid extraction vessel 26 by any suitable means such as screw conveyor 27. In the present drawing, screw conveyor 27 appears to be quite long, but this has no significance, as tank 26 could be located directly under separating means 24, and conveyor 27 completely eliminated. However such conveyors can be used between elements if needed in the economic planning of the plant design.

The tar-containing black is preferably vigorously agitated by any suitable agitating means known to the prior art such as motor driven impeller 28, and is mixed with a liquid solvent comprising essentially a chlorinated hydrocarbon. Preferably the major portion, and in fact substantially all of said reactant solvent is a chlorinated hydrocarbon having from 1 to 3 carbon atoms and n chlorine atoms in each molecule where $n$ is a number from 1 to a number equal to 2 plus twice the number of carbon atoms in each molecule, in order to obtain the best results. Obviously minor additions of other chemicals, such as hydrocarbons or oxygenated hydrocarbons, can be tolerated without undue reduction of the tar-dissolving power of the solvent, and their use should not be regarded as outside the scope of the present invention, but they should be regarded as in the nature of mere diluents or added solvents for use with the solvent in the present process. While the chlorinated hydrocarbons having longer carbon chains in their molecules may in a number of instances be operable in the process, they are not as effective as those with less than three carbon atoms, and in fact the best results in the present process both as to extraction of tar in vessel 26 and as to the formation of hydrogen chloride in furnace 1 is obtained by using chloroform, carbon tetrachloride, or ethylene dichloride.

The extraction of the tar is completed by passing the carbon black, solvent and tar slurry from vessel 26 to settler 31 through pipe 32 where the solvent and contained tar is decanted through pipe 33 and wet carbon black is drawn off through pipe 34 controlled by valve 37 by gravity, or other conveying means (not shown) which may be like conveyor 27.

As the carbon black is the major product of the process its progress will be traced first:

Wet carbon black 34 is introduced into a drying drum 36 by any suitable means. In order to accelerate the drying it is generally preferable to have a burner 38 to heat the drying drum 36. The amount of solvent in a wet black 34 is relatively small and is driven off in the form of vapor in drum 36. As the amount is small it could be wasted to the atmosphere, but in large scale operations it is found that it is more economical to recover such amounts of solvent by passing the same through pipe 39 to a solvent recovery system 41 which will be discussed later. The dried carbon black coming from drum 36 is discharged into bin 42 generally in the form of flocculent carbon black 43 as the drying drum 36 is generally operated under non-pelleting conditions. However, if desired, drum 36 can be operated to partially or completely pellet carbon black 43 at the same time the carbon black is being dried. It is regarded as preferable however to have a source of supply of flocculent carbon black 44 from bin 42 for those desiring such a product and then take a portion 46 of said flocculent carbon black and introduce it into a pelleting mill 47 by suitable means such as conveyor 48. Mill 47 is operated in the conventional manner to produce carbon black pellets 49 which are discharged into bin 51.

The major portion 33 of the chlorinated hydrocarbon solvent containing dissolved tar is separated from said tar by any suitable separating means 56 and a major portion 57 of said solvent then is recycled through line 29 by any suitable means such as gravity or pumps (not shown) to the extraction tank 26, but the following separating means and process are preferred:

The tar-containing solvent 33 is passed through a heater 52 under the pressure of pump 53 at such pressure and temperature so that when this heated solvent is discharged through valve 54 into flash tank 56 the major portion of the solvent will turn into vapors and pass out line 57 for condensation in condenser 58 and return through line 29. Whatever quantity of makeup solvent is necessary is added through line 59. The tar along with a minor proportion of solvent accumulates in the lower portion of flash tank 56 and is pumped into line 61 by pump 62; anywhere from 50 to 95 per cent is vaporized in 56.

At the same time, if solvent recovery 41 is employed, the solvent from wet carbon black 34 driven off in drying drum 36 and passing through line 39 is preferably condensed in 41 by cooling and then instead of being added to line 29 this small amount of tar-free solvent from 41 is pumped by pump 63 into line 61, or it can be absorbed in 41 and desorbed in cycles.

The tar and solvent in line 61 is then added to the reactant hydrocarbon passing into furnace 1 and this may be done through one or more of lines 64, 66 and 67 depending on the adjustment of the shut off valve shown in each of these lines. The tar and solvent added through line 64 is preheated with the oil and/or gas from valve 6 and 7 in vaporizer 8, while that passing through line 66 is added to the hydrocarbon in its gaseous state in line 2, and that passing through line 67 is added directly to the gas inside furnace 1. In the case of line 67 it can enter the furnace through a pipe having an upper end adjacent the end of line 2 so that the gases emerging from line 2 into the furnace tend to atomize and aspirate the tar and solvent from line 67.

Due to the presence of chlorinated hydrocarbons in carbon black furnace 1, off gas 23 will contain hydrogen chloride which may be separated in any suitable manner. Off gas in line 23 passes to a condenser 68 and is cooled to a temperature of from 70° to 150° F. so that water and HCl condense as an aqueous solution in separator 81. The remaining gas is withdrawn through line 71. The condensed aqueous HCl passes to a concentrator 73 where it is concentrated by evaporation to 15 to 36 weight per cent HCl, which may be recovered as a by-product. Part of the concentrated aqueous HCl is distilled with 90-98 per cent sulfuric acid in concentrator 76 to recover anhydrous HCl for recycle through line 78 or withdrawal through 77. Aqueous $H_2SO_4$ is withdrawn through line 83 for concentration and reuse.

Operation

Hydrocarbon comprising gas 4, or oil 3, or mixtures thereof, is vaporized in 8 and passed through 2 into furnace 1 where a portion is converted by pyrochemical action into carbon black. The resulting carbon black is cooled at 18, 19 and/or 21 and separated at 24 to produce carbon black 22 and off gas 23.

Carbon black 22 is extracted with a chlorinated hydrocarbon solvent in 26 as to its tar content and is separated in 31 and dried in 36 to form flocculent black 44 or pelleted black 51.

The solvent and contained tar from 31 is heated in 52 and the solvent flashed off in flash tank 56. The solvent passes overhead through 57 and condenser 58 back to the extraction tank 26.

The tar and some solvent from flash tank 56, along with solvent recovered at 41 from drying drum 36, is passed to the carbon black furnace 1 through line 61 and related lines where a portion of it is converted to carbon black and hydrogen chloride. Besides increasing the feed to furnace 1 the presence of the hydrogen chloride, chlorinated hydrocarbon, and/or chlorine in any form in the reaction zone of furnace 1 from lines 64, 66 and/or 67 is believed to reduce the pH of the carbon black being formed and/or increase the time it can be mixed or compounded with rubber without scorching the same.

Oxygen-containing gas, generally air but sometimes air enriched with oxygen or even substantially pure oxygen, from line 9 is introduced tangentially into furnace 1 through line 16 with or without fuel added from valve 13 to provide oxygen for combustion in the furnace and this combustion is carried on to provide heat for pyrochemical action in converting a portion of the hydrocarbons, tar and chlorinated hydrocarbons to carbon black in furnace 1.

The hydrogen chloride in off gas 23 is removed by a separating system which may comprise a condenser 68 and vessel 76 from which the hydrogen chloride is returned through a line 78 and associated lines to the carbon black furnace and some hydrogen chloride can be removed through line 77 as a by-product of the process.

In the operation of the process best results are obtainable when the hydrocarbon feed 2 comprises essentially a refractory gas oil comprising aromatics and having an aniline point below 150° F. and an end boiling point less than 800° F.

While air 9 is preferred for injection at 16 along with natural gas as fuel from 4 which is injected tangentially through 16 into furnace 1, and the combustion substantially completed before contacting hydrocarbon 2, valuable results are also obtained by closing valve 13 and injecting straight air 9 through 16 to burn a portion of hydrocarbon 2 to produce the necessary heating effect. Chloroform is preferred as solvent 59.

While the system and its various component parts have been shown in considerable detail, this has been done for the purpose of illustrating a preferred embodiment of the invention, which invention is not limited thereto but is defined by the following claims.

Having described my invention, I claim:

1. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon having from 1 to 3 carbon atoms and $n$ chlorine atoms in each molecule, where $n$ is a number from 1 to a number equal to 2 plus twice the number of carbon atoms in each molecule, separating the major portion of said solvent from said extracted tar and recycling said major portion of said solvent to the extracting step, continuously adding the remaining solvent and tar mixture to the hydrocarbon passing into said furnace, continuously forming hydrogen chloride by pyrochemical action in said first zone in said furnace in and by said same cracking operation that forms said carbon black, recovering said hydrogen chloride and said carbon black from said effluent gases containing both hydrogen chloride and carbon black, continuously recycling a portion of said hydrogen chloride to said furnace, drying said carbon black, recovering the chlorinated solvent from said drying step and continuously adding the recovered chlorinated solvent to said hydrocarbon passing into said furnace.

2. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon, separating the major portion of said solvent from said extracted tar and recycling said major portion of said solvent to the extracting step, continuously adding the remaining solvent and tar mixture to the hydrocarbon passing into said furnace, continuously forming hydrogen chloride by pyrochemical action in said first zone in said furnace in and by said same cracking operation that forms said carbon black, recovering said hydrogen chloride and said carbon black from said effluent gases containing both hydrogen chloride and carbon black, continuously recycling a portion of said hydrogen chloride to said furnace, recovering the chlorinated solvent by evaporation from said carbon black and continuously adding the recovered chlorinated solvent to said hydrocarbon passing into said furnace.

3. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon, continuously adding the solvent and tar mixture to the hydrocarbon passing into said furnace, continuously forming hydrogen chloride by pyrochemical action in said first zone in said furnace in and by said same cracking operation that forms said carbon black, recovering said hydrogen chloride and said carbon black from said effluent gases containing both hydrogen chloride and carbon black, continuously recycling a portion of said hydrogen chloride to said furnace, drying said carbon black, recovering the chlorinated solvent from said drying step and continuously adding the recovered chlorinated solvent to said hydrocarbon passing into said furnace.

4. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon having from 1 to 3 carbon atoms and $n$ chlorine atoms in each molecule, where $n$ is a number from 1 to a number equal to 2 plus twice the number of carbon atoms in each molecule, continuously adding the solvent and tar mixture to the hydrocarbon passing into said furnace, continuously forming hydrogen chloride by pyrochemical action in said first zone in said furnace in and by said same cracking operation that forms said carbon black, recovering said hydrogen chloride and said carbon black from said effluent gases containing both hydrogen chloride and carbon black, continuously recycling a portion of said hydrogen chloride to said furnace and drying said carbon black.

5. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon, continuously adding the solvent and tar mixture to the hydrocarbon passing into said furnace, continuously forming hydrogen chloride by pyrochemical action in said first zone in said furnace in and by said same cracking operation that forms said carbon black, recovering said hydrogen chloride and said carbon black from said effluent gases containing both hydrogen chloride and carbon black, continuously recycling a portion of said hydrogen chloride to said furnace, drying said carbon black, recovering the chlorinated solvent from said drying step and continuously adding the recovered chlorinated solvent to said hydrocarbon passing into said furnace.

6. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon, separating the major portion of said solvent from said extracted tar and recycling said major portion of said solvent to the extracting step, continuously adding the remaining solvent and tar mixture to the hydrocarbon passing into said furnace, continuously forming hydrogen chloride by pyrochemical action in said first zone in said furnace in and by said same cracking operation that forms said carbon black, recovering said hydrogen chloride and said carbon black from said effluent gases containing both hydrogen chloride and carbon black, continuously drying said carbon black.

7. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon having from 1 to 3 carbon atoms and $n$ chlorine atoms in each molecule, where $n$ is a number from 1 to a number equal to 2 plus twice the number of carbon atoms in each molecule, separating the major portion of said solvent from said extracted tar and recycling said major portion of said solvent to the extracting step, continuously adding the remaining solvent and tar mixture to the hydrocarbon passing into said furnace, continuously forming hydrogen chloride by pyrochemical action in said first zone in said furnace in and by said same cracking operation that forms said carbon black, recovering said hydrogen chloride and said carbon black from said effluent gases containing both hydrogen chloride and carbon black, continuously drying said carbon black.

8. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon having from 1 to 3 carbon atoms and $n$ chlorine atoms in each molecule, where $n$ is a number from 1 to a number equal to 2 plus twice the number of carbon atoms in each molecule, continuously adding the solvent and tar mixture to the hydrocarbon passing into said furnace, continuously forming hydrogen chloride by pyrochemical action in said first zone in said furnace in and by said same cracking operation that forms said carbon black, recovering said hydrogen chloride and said carbon black from said effluent gases containing both hydrogen chloride and carbon black, continuously, and recycling a portion of said hydrogen chloride to said furnace.

9. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon, continuously adding the solvent and tar mixture to the hydrocarbon passing into said furnace, continuously forming hydrogen chloride by pyrochemical action in said first zone in said furnace in and by said same cracking operation that forms said carbon black, recovering said hydrogen chloride and said carbon black from said effluent gases containing both hydrogen chloride and carbon black, continuously, and recycling a portion of said hydrogen chloride to said furnace.

10. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon having from 1 to 3 carbon atoms and $n$ chlorine atoms in each molecule, where $n$ is a number from 1 to a number equal to 2 plus twice the number of carbon atoms in each molecule separating the major portion of said solvent from said extracted tar and recycling said major portion of said solvent to the extracting step, continuously adding the remaining solvent and tar mixture to the hydrocarbon passing into said furnace, continuously forming hydrogen chloride by pyrochemical action in said first zone in said furnace in and by said same cracking operation that forms said carbon black and recovering said hydrogen chloride and said carbon black from said effluent gases containing both hydrogen chloride and carbon black, continuously.

11. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon, separating the major portion of said solvent from said extracted tar and recycling said major portion of said solvent to the extracting step, continuously adding the remaining solvent and tar mixture to the hydrocarbon passing into said furnace, continuously forming hydrogen chloride by pyrochemical action in said first zone in said furnace in and by said same cracking operation that forms said carbon black and recovering said hydrogen chloride and said carbon black from said effluent gases containing both hydrogen chloride and carbon black, continuously.

12. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon, continuously adding the solvent and tar mixture to the hydrocarbon passing into said furnace, continuously forming hydrogen chloride by pyrochemical action in said first zone in said furnace in and by said same cracking operation that forms said carbon black and recovering said hydrogen chloride and said carbon black from said effluent gases containing both hydrogen chloride and carbon black, continuously.

13. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon having from 1 to 3 carbon atoms and $n$ chlorine atoms in each molecule, where $n$ is a number from 1 to a number equal to 2 plus twice the number of carbon atoms in each molecule, separating the major portion of said solvent from said extracted tar and recycling said major portion of said solvent to the extracting step, continuously adding the remaining solvent and tar mixture to the hydrocarbon passing into said furnace and continuously forming hydrogen chloride by pyrochemical action in said first zone in said furnace in and by said same cracking operation that forms said carbon black.

14. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon, separating the major portion of said solvent from said extracted tar and recycling said major portion of said solvent to the extracting step, continuously adding the remaining solvent and tar mixture to the hydrocarbon passing into said furnace and continuously forming hydrogen chloride by pyrochemical action in said first zone in said furnace in and by said same cracking operation that forms said carbon black.

15. In a continuous furnace carbon black producing process comprising the continuous steps of passing a hydrocarbon in a gaseous state into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising continuously operating said furnace to produce a carbon black in said first zone containing tar, extracting the tar from said carbon black with a liquid solvent comprising essentially a chlorinated hydrocarbon, continuously adding the solvent and tar mixture to the hydrocarbon passing into said furnace and continuously forming hydrogen chloride by pyrochemical action in said first zone in said furnace in and by said same cracking operation that forms said carbon black.

GEORGE N. CADE.

REFERENCES CITED

The following references are of record in the file of this patent:

UNITED STATES PATENTS

| Number | Name | Date |
|---|---|---|
| 1,259,121 | Mott | Mar. 12, 1918 |
| 1,990,228 | Frenkel | Feb. 5, 1935 |
| 2,238,576 | Heller et al. | Apr. 15, 1941 |
| 2,375,795 | Krejci | May 15, 1945 |